UNITED STATES PATENT OFFICE.

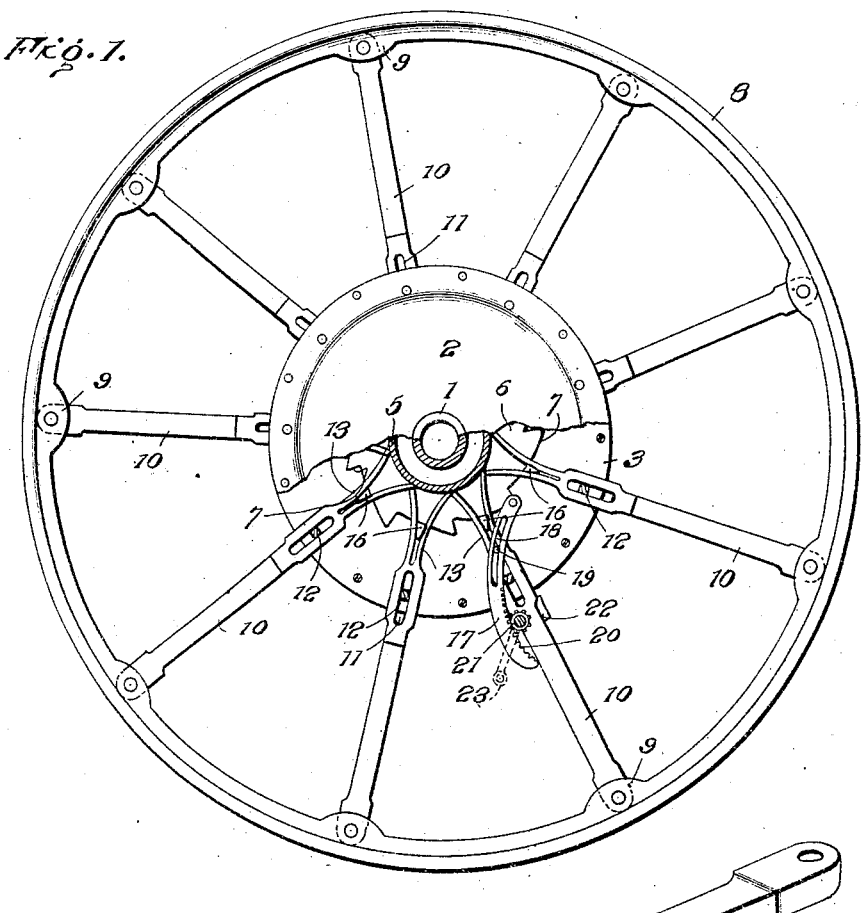
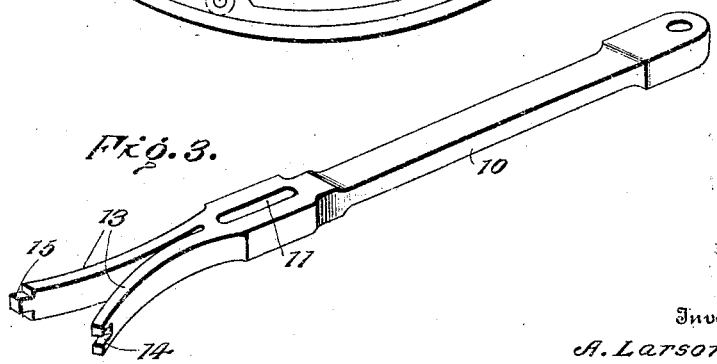

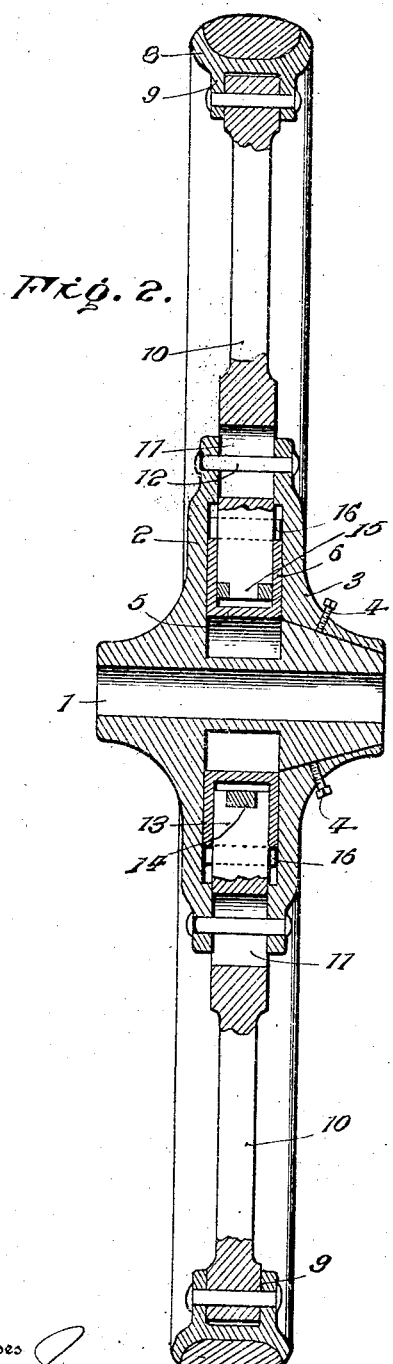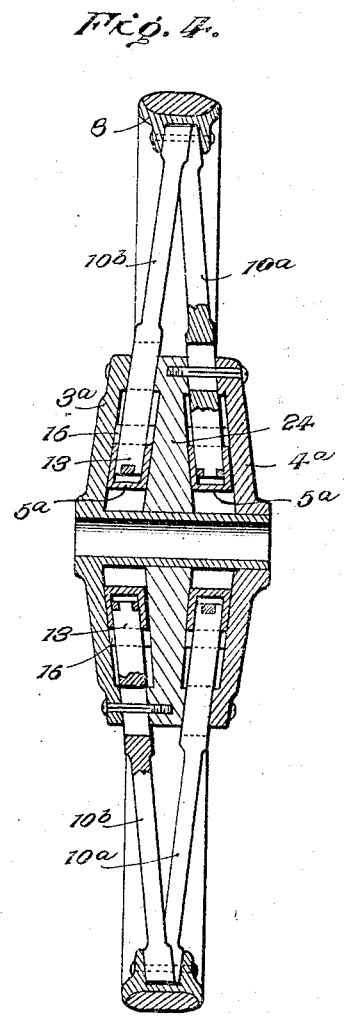

ALFRED LARSON, OF SCOBEY, MONTANA, ASSIGNOR OF ONE-HALF TO RALPH E. PATCH, OF POPLAR, MONTANA.

SPRING-WHEEL.

No. 910,396.  Specification of Letters Patent.  Patented Jan. 19, 1909.

Application filed February 28, 1908. Serial No. 418,332.

*To all whom it may concern:*

Be it known that I, ALFRED LARSON, citizen of the United States, residing at Scobey, in the county of Valley and State of Montana, have invented certain new and useful Improvements in Spring-Wheels, of which the following is a specification.

The present invention relates to certain new and useful improvements in the construction of wheels of that type which derive the required resiliency from metallic springs which are so arranged as to absorb all shocks and jars and prevent the same from reaching the axle or body of the vehicle.

The object of the invention is to provide a wheel embodying a peculiar construction and arrangement of the spring members which permits of the resiliency being regulated to accommodate the wheel to light or heavy loads.

For a full description of the invention and the merits thereof and also to acquire a knowledge of the details of construction and the means for effecting the result, reference is to be had to the following description and accompanying drawings, in which:

Figure 1 is a side elevation of a wheel embodying the invention, portions being broken away. Fig. 2 is a vertical sectional view through the same. Fig. 3 is a detail view of one of the spoke members. Fig. 4 is a vertical sectional view showing a modification.

Corresponding and like parts are referred to in the following description and indicated in all the views of the drawings by the same reference characters.

Specifically describing the preferred embodiment of the invention the numeral 1 designates the hub which is formed with the usual axle receiving opening and is provided with spaced annular flanges 2 and 3, the flange 2 being shown as formed integral with the hub while the flange 3 is detachably connected thereto by means of the screws 4 or similar fastening members. A ring 5 is loosely mounted between the flanges 2 and 3, the said ring being somewhat larger than the portion of the hub between the flanges and being provided with the outstanding edge portions 6 which are formed with a plurality of cam surfaces 7 corresponding to the various spoke members as will be hereinafter described. The rim 8 of the wheel is formed at intervals in its periphery with the spaced ears 9 between which the outer extremities of the spokes 10 are pivotally mounted. The inner portions of the said spokes are received loosely between the hub flanges 2 and 3 and are formed with the longitudinally disposed slots 11 within which operate the bolts 12 connecting the outer edges of the hub flanges 2 and 3. The inner extremities of the spokes 10 carry the spring extensions 13 which have an interlocking connection with each other and are designed to engage the ring 5 in the operation of the wheel. In the present instance it will be observed that a pair of diverging spring extensions 13 projects from each of the spokes, the extremities of the extensions being received between the outstanding edge portions 6 of the ring 5. It will also be apparent that one of the spring extensions 13 upon each of the spokes is provided at its extremity with a notch 14 while the opposite extension is formed with a tongue 15, the said tongues being received within the notches of the extensions upon adjacent spokes and an interlocking connection being thereby provided between the various extensions.

In order to enable the tension in the spring extensions 13 and thereby the resiliency of the wheel to be adjusted key members 16 are arranged between the diverging extensions of each of the spokes 10 and engage the before mentioned cam surfaces 7 of the outstanding edges 6 upon the ring 5. It will thus be apparent that upon rotating the ring 5 the keys 16 may either be wedged between the respective pairs of spring extensions so as to increase the stiffness or rigidity of the construction, or may be retracted or permitted to move inwardly to increase the resiliency of the wheel as would be required for light loads. An arm 17 is utilized for moving the ring 5 and adjusting the keys 16, the said arm having a curved formation and being provided at its intermediate portion with a longitudinal slot 18 receiving loosely a pin 19 projecting from one of the spokes 10. The inner extremity of the arm 17 is pivotally connected to one of the outstanding edges of the ring 5 while the opposite end portion is formed with a rack 20 engaging a pinion 21 journaled on a bracket 22 secured to the spoke 10. A crank 23 may be utilized for turning the pinion 21 and moving the arm 17 longitudinally to rotate the ring 5 and move the cam surfaces 7 with respect to the keys 16 whereby the latter are either wedged between the respective pairs of spring extensions to increase the rigidity of the wheel, or permitted to move inwardly toward the center of the wheel whereby the resiliency of the latter is increased.

In the operation of the wheel it will be readily apparent that the bolts 12 passing through those spokes in a vertical position do not interfere with the up and down movement of the hub portion of the wheel since they are permitted to reciprocate freely within their respective slots 11. Those of the spokes 10 however which are in a horizontal or lateral position operate through the medium of the spring extensions 13 to hold the hub portion of the wheel against movement and thereby produce the required resiliency in the wheel.

A modification is shown in Fig. 4 in which the wheel is provided with two sets of spokes 10ª and 10ᵇ which are diverged outwardly in opposite directions from the rim 8. An intermediate annular flange 24 is also shown as located between the two flanges 3ª and 4ª whereby two annular spaces are provided, one for each set of spoke members. A ring 5ª similar to the before mentioned ring 5 is located within each of these spaces and receives the extremities of the spring extensions 13 at the inner ends of the spokes. This wheel is especially designed for heavy vehicles and the tension in the spring members 13 can be adjusted through the medium of the keys 16 in a manner identical with that previously described in connection with the construction shown in the remaining three figures of the drawings.

Having thus described the invention, what is claimed as new is:

1. A spring wheel in which the spokes are each provided with a pair of diverging spring extensions coöperating with each other to impart resiliency to the wheel, the extremities of the extensions of adjacent spokes engaging each other and being formed respectively with a tongue and a notch.

2. A spring wheel in which the spokes are each provided with a pair of spring extensions coöperating with each other to impart resiliency to the wheel, keys arranged between the various pairs of extensions, and cams for moving the keys to regulate the tension in the spring extensions.

3. A spring wheel in which the spokes are each provided with a pair of spring extensions, a key arranged between each pair of the spring extensions, cams for operating the keys to regulate the tension in the spring extensions, and an arm for moving the cams, the said arm being adjustably connected to one of the spoke members.

4. In a wheel, the combination of a hub portion, a ring loosely mounted upon the hub portion, a rim, spokes extending inwardly from the rim and loosely connected to the hub portion, and spring extensions carried by the spokes and designed to engage the before mentioned ring.

5. In a wheel, the combination of a hub, a ring loosely mounted upon the hub and carrying cams, a rim, spokes extending inwardly from the rim and loosely connected to the hub, spring extensions carried by the spokes and adapted to engage the before mentioned ring, and keys controlled by the before mentioned cams and engaging the extensions to enable the tension therein to be regulated.

6. In a wheel, the combination of a hub formed with spaced flanges, a ring loosely mounted between the flanges, a rim, and spokes extending inwardly from the rim and received between the spaced flanges, the said spokes having a pin and slot connection with the said flanges, and spring extensions carried by the spokes and adapted to engage the before mentioned ring.

7. In a wheel, the combination of a hub formed with spaced flanges, a ring loosely mounted between the flanges and carrying outstanding edge portions formed with cam surfaces, a rim, spokes extending inwardly from the rim and having a pin and slot connection with the flanges in the hub, a pair of spring extensions carried by each spoke and designed to engage the before mentioned ring, and a key arranged between each pair of extensions and designed to be operated by the before mentioned cam surfaces upon the outstanding edges of the ring to regulate the tension in the spring extensions.

In testimony whereof I affix my signature in presence of two witnesses.

ALFRED LARSON. [L. S.]

Witnesses:
JAMES MACDONALD,
ANDREW OLSON.